Oct. 31, 1933.   P. HÖFER   1,932,587
PRODUCTION OF POTASSIUM NITRATE
Filed April 10, 1930
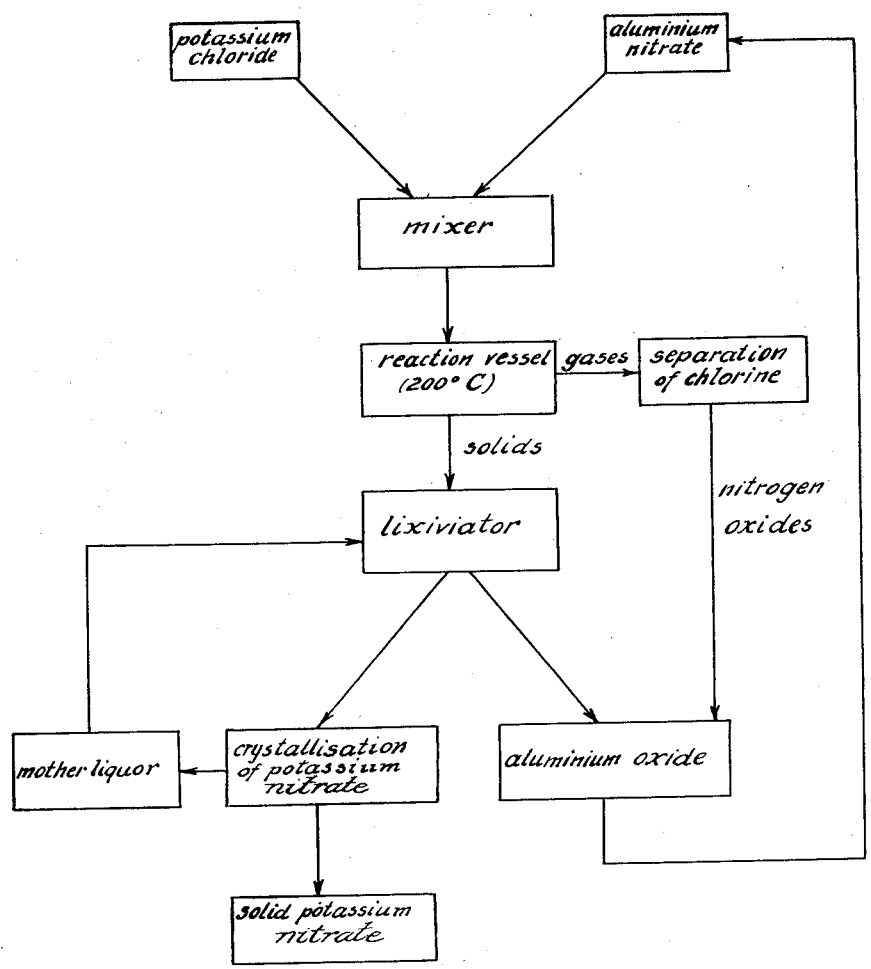
Inventor:
Paul Höfer
by Karl Michaelis
Atty.

Patented Oct. 31, 1933

1,932,587

UNITED STATES PATENT OFFICE 1,932,587

PRODUCTION OF POTASSIUM NITRATE

Paul Höfer, Berlin, Germany

Application April 10, 1930, Serial No. 443,250, and in Germany April 19, 1929

10 Claims. (Cl. 23—102)

My invention refers to the production of potassium nitrate and more especially to the recovery of this salt from aluminium nitrate and potassium chloride. It is an object of my invention to provide means whereby this recovery can be effected in a more efficient and economical manner than was hitherto possible.

It is known to recover potassium nitrate from aluminium nitrate and potassium chloride by reaction between these two salts in neutral or acid solution. In these known methods the fact is relied upon, that the salts of aluminium have the tendency of decomposing at comparatively low temperature in the presence of water. However these processes yield only a comparatively impure product, which must be purified and more especially freed from aluminium salts by washing.

I have now found that potassium nitrate can be recovered in a simpler and more advantageous manner by heating an intimate mixture of aluminium nitrate and potassium chloride in the absence of water, i. e. a mixture of the solid reagents to about 200° C. until the gases developed thereby, which contain nitrogen oxides and chlorine, are all expelled. In this reaction aluminium nitrate with any desired percentage of water may be used, for instance the salt $Al(NO_3)_3 \cdot 9H_2O$. If the two starting products are mixed in molecular proportion, the chlorine will be expelled only incompletely and the heated mixture will contain aluminium oxide, potassium chloride and potassium nitrate, only about 65% of the potassium chloride having been converted into potassium nitrate. If this mixture is lixiviated at 25° C. or below in such manner that the potassium chloride has just been dissolved altogether and a solution has been formed which is saturated with respect to both the potassium salts, containing comparatively little potassium nitrate, the heat treatment now following will cause the greatest part of the potassium nitrate to crystallize out in pure form, while the aluminium oxide is reconverted into aluminium nitrate by means of nitric acid or nitrous gases. In the latter case I prefer using for this purpose the gases resulting in the heat treatment of the original salt mixture, after these gases have been freed from the chlorine. The solution containing the two potassium salts is concentrated by evaporation until it is saturated with the two salts. At about 100° C. about 85% of the potassium chloride will separate out in crystalline form. The subsequent crystallization on cooling results in a potassium nitrate containing about 4% potassium chloride. By washing with water or with a liquor resulting from the crystallization of the mother liquor or by diluting and cooling the solution with such liquor, about 85% of the potassium nitrate is recovered in pure form. The solution which is now saturated again with both the salts can be treated further together with further quantities of the same solution resulting in a subsequent operation.

If, instead of a mixture containing the aluminium nitrate and potassium chloride in molecular proportion, a mixture containing about 70% aluminium nitrate in excess of the molecular quantity is used, the heating of the mixture results in a mixture of potassium nitrate and alumina, which is almost free from chlorine and the constituents of which can be separated by lixiviation with a hot solvent. From this solution the potassium nitrate is obtained in pure crystalline from. A mixture containing less aluminium nitrate than indicated above can be used provided that the mixture is permanently moved or stirred. The hot liquor takes up the aluminium chloride and nitrate present in the calcined residue in very small quantities and can be reused several times.

It is possible to further reduce the quantity of chlorine in the residue if the melt is stirred during heating or if instead of a surplus of 70% aluminium nitrate a surplus of about 75% is used.

In the drawing annexed to and forming part of this specification the process is illustrated diagrammatically.

*Example*

In order to recover 100 kgs. potassium nitrate, 74.6 kgs. potassium chloride are intimately mixed with 219 kgs. $Al(NO_3)_3 \cdot 9H_2O$ of 55,15% (equal to 120,7 kgs. $Al(NO_3)_3$) and the mixture is gradually heated to 200° C. in an air current. Hydrochloric acid gas, nitric acid gas and nitrosyl chloride escape and are freed from chlorine by conducting the gases over heated lime. The gases are then conducted over the wet alumina resulting in the process, which is thus reconverted into aluminium nitrate which may be reused in cycle. The residue remaining over at the end of the heat treatment (143 kgs.) contains 64.6 kgs. $NO_3$
39.1 kgs. K
1.6 kgs. Cl
37.7 kgs. $Al_2O_3 + H_2O$ 143.0 kgs.

This residue is now lixiviated with 140 kgs. of a hot potassium nitrate liquor saturated at 20° C. On cooling 100 kgs. pure potassium nitrate separate out, which contain only traces of chlorine.

Various changes may be made in the details disclosed in the foregoing specification without departing from the invention or sacrificing the advantages thereof.

In the claims affixed to this specification no selection of any particular modification of the invention is intended to the exclusion of other modifications thereof and the right to subsequently make claim to any modification not covered by these claims is expressly reserved.

I claim:

1. The method of recovering potassium nitrate comprising heating a mixture of solid aluminium nitrate and solid potassium chloride to about 200° C. to expel nitrous gases and chlorine, treating the residue with a hot watery liquid to dissolve the potassium nitrate formed, separating same by crystallization, treating the alumina remaining over in the residue with a nitrogen-oxygen compound to reconvert it into aluminium nitrate and returning same to the cycle.

2. The method of recovering potassium nitrate comprising heating a mixture of solid aluminium nitrate and solid potassium chloride to about 200° C. to expel nitrous gases and chlorine treating the residue with a hot watery solution of potassium nitrate to dissolve the potassium nitrate formed, separating same by crystallization, treating the alumina remaining over in the residue with a nitrogen-oxygen compound to reconvert it into aluminium nitrate and returning same to the cycle.

3. The method of recovering potassium nitrate comprising heating a mixture of solid aluminium nitrate and solid potassium chloride to about 200° C. to expel nitrous gases and chlorine, treating the residue with a hot watery liquid to dissolve the potassium nitrate formed, separating same by crystallization, treating the alumina remaining over in the residue with nitrous gases to reconvert it into aluminium nitrate and returning same to the cycle.

4. The method of recovering potassium nitrate comprising heating a mixture of solid aluminium nitrate and solid potassium chloride to about 200° C. to expel nitrous gases and chlorine, treating the residue with a hot watery solution of potassium nitrate to dissolve the potassium nitrate formed, separating same by crystallization, treating the alumina remaining over in the residue with nitrous gases to reconvert it into aluminium nitrate and returning same to the cycle.

5. The method of recovering potassium nitrate comprising heating a mixture of solid aluminium nitrate and solid potassium chloride to about 200° C. to expel nitrous gases and chlorine, treating the residue with a hot watery liquid to dissolve the potassium nitrate formed, separating same by crystallization, freeing the mixture of nitrous gases and chlorine resulting in the heat treatment of the starting mixture from chlorine and treating the alumina remaining over in the solid residue from said heat treatment with the nitrous gases freed from chlorine to reconvert same into aluminium nitrate and returning same to the cycle.

6. The method of recovering potassium nitrate comprising heating a mixture of solid aluminium nitrate and solid potassium chloride to about 200° C. to expel nitrous gases and chlorine, treating the residue with a hot watery liquid to dissolve the potassium nitrate formed, separating same by crystallization, treating the alumina remaining over in the residue, while still in wet condition, with a nitrogen-oxygen compound to reconvert it into aluminium nitrate and returning same to the cycle.

7. The method of recovering potassium nitrate comprising heating a mixture of solid aluminium nitrate and solid potassium chloride to about 200° C. to expel nitrous gases and chlorine, treating the residue with a hot watery liquid to dissolve the potassium nitrate formed, separating same by crystallization, treating the alumina remaining over in the residue, while still in wet condition, with nitrous gases to reconvert it into aluminium nitrate and returning same to the cycle.

8. The method of recovering potassium nitrate comprising heating a mixture of solid aluminium nitrate and solid potassium chloride to about 200° C. to expel nitrous gases and chlorine, treating the residue with a hot watery liquid to dissolve the potassium nitrate formed and separating such potassium nitrate by crystallization.

9. The method of recovering potassium nitrate comprising heating a mixture of solid aluminium nitrate and solid potassium chloride to about 200° C. to expel nitrous gases and chlorine, treating the residue with a hot watery solution of potassium nitrate to dissolve the potassium nitrate formed and separating such potassium nitrate by crystallization.

10. The method of recovering potassium nitrate comprising heating a mixture of solid potassium chloride and more than the equivalent quantity of solid aluminium nitrate to about 200° C. to expel nitrous gases and chlorine, treating the residue with a hot watery liquid to dissolve the potassium nitrate formed and separating said potassium nitrate by crystallization.

PAUL HÖFER.